Aug. 24, 1965            H. D. FATT            3,202,463
BEARING CAP, BLOCK AND OIL PAN SEAL
Original Filed Oct. 7, 1960            2 Sheets-Sheet 1
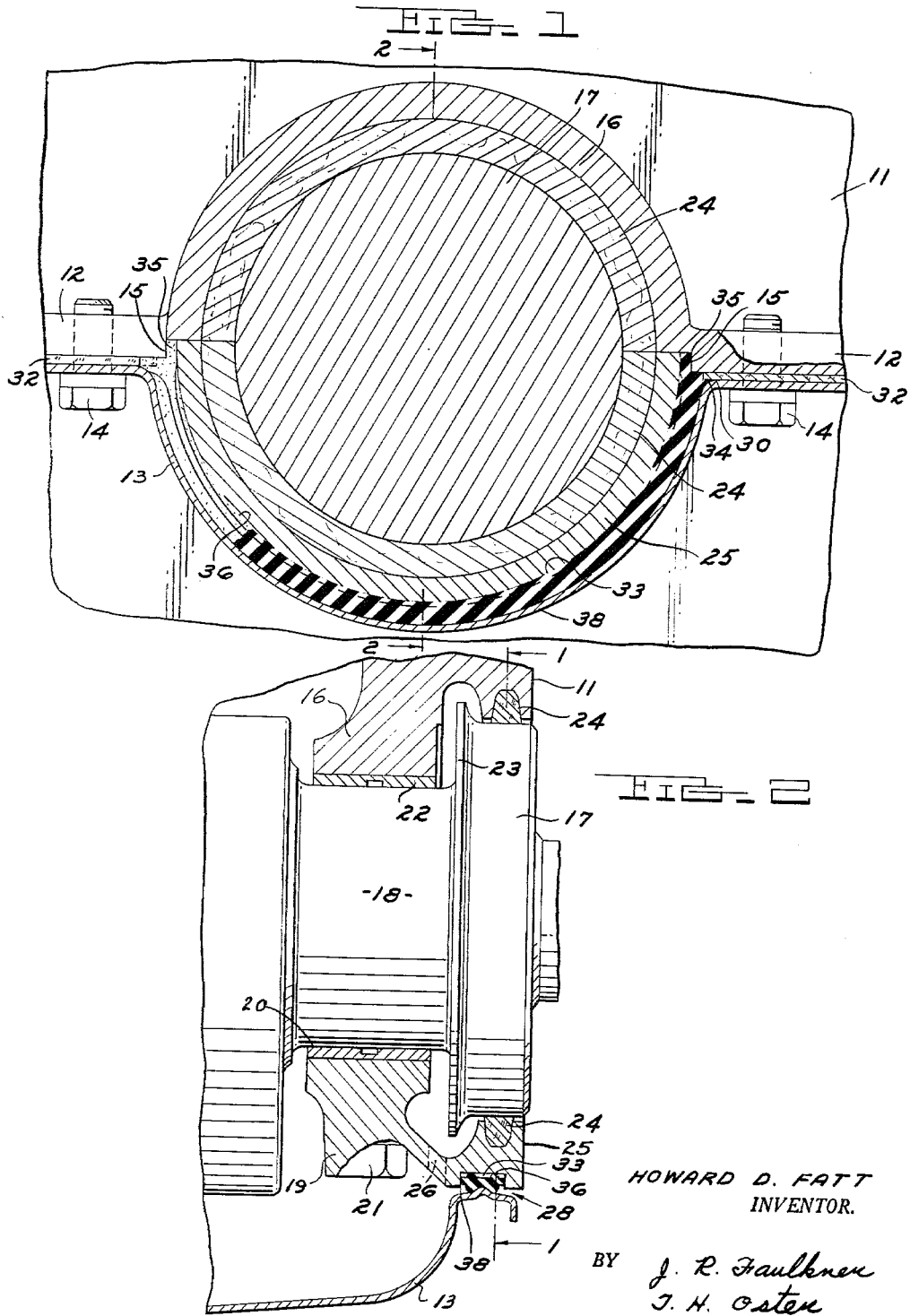
HOWARD D. FATT
INVENTOR.
BY J. R. Faulkner
J. H. Oster
ATTORNEYS Aug. 24, 1965  H. D. FATT  3,202,463
BEARING CAP, BLOCK AND OIL PAN SEAL
Original Filed Oct. 7, 1960  2 Sheets-Sheet 2
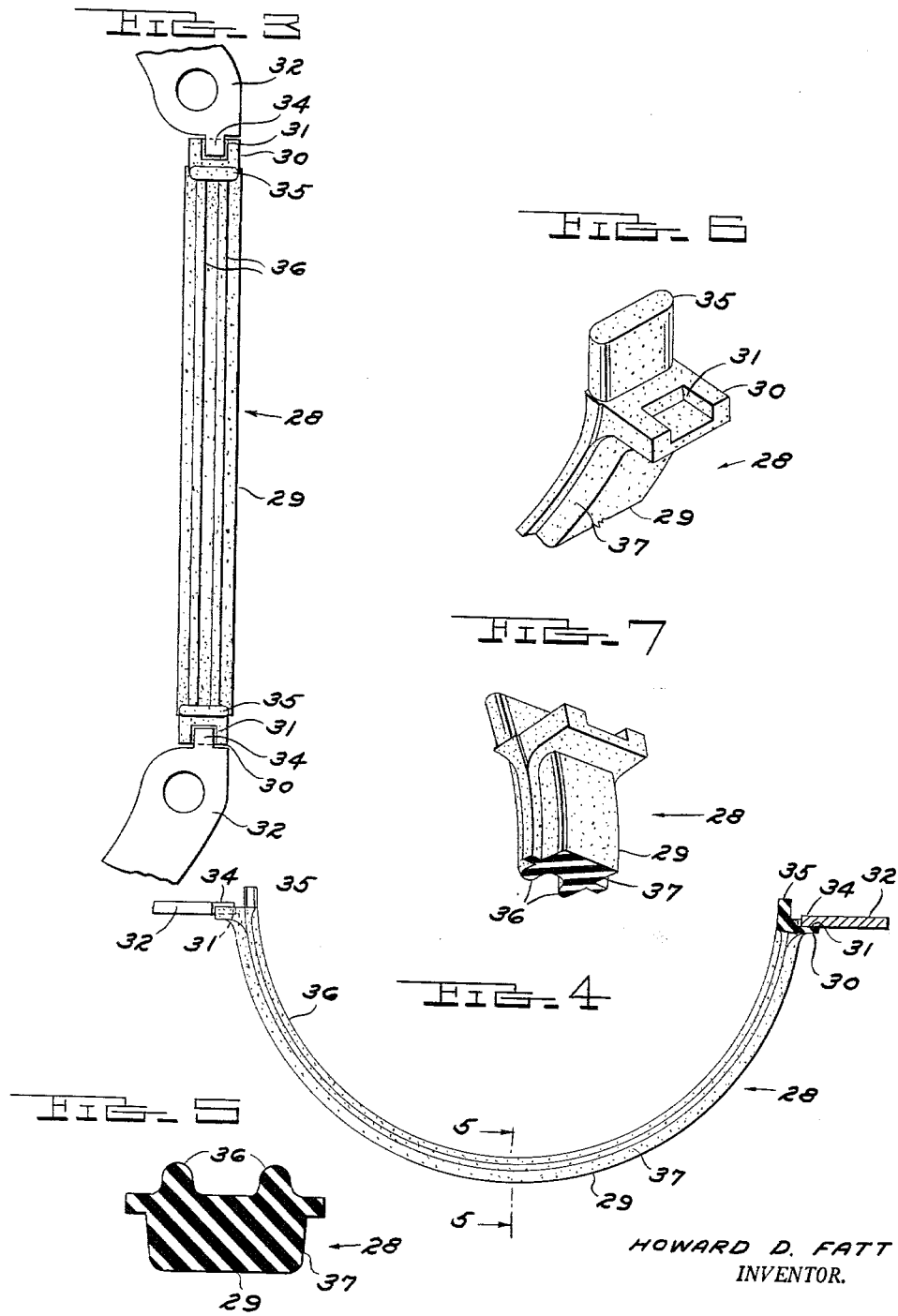
HOWARD D. FATT
INVENTOR.
BY J. R. Faulkner
J. H. Oster
ATTORNEYS

# United States Patent Office 3,202,463
Patented Aug. 24, 1965

3,202,463
BEARING CAP, BLOCK AND OIL PAN SEAL
Howard D. Fatt, Inkster, Mich., assignor to Ford Motor Company, Dearborn, Mich., a corporation of Delaware
Continuation of application Ser. No. 61,312, Oct. 7, 1960. This application May 31, 1962, Ser. No. 199,580
9 Claims. (Cl. 308—23)

This application is a continuation of my application Serial No. 61,312, filed October 7, 1960, now abandoned, and assigned to the assignee of this application.

This invention relates to seals generally and more particularly to a novel one piece seal used to prevent fluid leakage between a plurality of parts.

A seal made in accordance with this invention may be used in internal combustion engines. For example, the seal may be used to provide sealing means between the rear main bearing cap and the cylinder block. It is also used to provide sealing means between the underside of the rear main bearing cap and the oil pan and cylinder block. Furthermore, the seal also provides positioning means for the ends of the oil pan gasket and prevents leakage between the seal and the oil pan gasket by the use of an overlapping joint.

This invention will be better understood upon reference to the attached figures of the drawing in which:

FIGURE 1 is a fragmentary elevational view of the rear main bearing area of an internal combustion engine taken substantially in the plane indicated as 1—1 of FIGURE 2;

FIGURE 2 is a fragmentary longitudinal sectional view taken substantially in the plane indicated as 2—2 of FIGURE 1;

FIGURE 3 is an enlarged fragmentary plan view of the oil pan seal and gasket;

FIGURE 4 is a side elevational view partly in section of the structure shown in FIGURE 3;

FIGURE 5 is a cross sectional view of the seal taken in the plane indicated as 5—5 of FIGURE 4;

FIGURE 6 is a fragmentary perspective view of the terminal end portion of the seal and looking from above; and FIGURE 7 is a fragmentary perspective view of the terminal end portion of the seal and looking from below.

Referring now to the drawings, a cylinder block is indicated at 11 and is provided with a peripheral flange 12 to which an oil pan 13 is secured by bolts 14. Cylinder block 11 has a saddle shaped portion 15 in the rear block wall that is defined by an upwardly extending arcuate recess beginning in the cylinder block flange 12. An upper rear main bearing support 16 is provided at the forwardmost part of the saddle shaped portion 15 for the support of crankshaft 17. Crankshaft 17 has a journal 18 supported in part by the upper rear main bearing support 16 and in part by the rear main bearing cap 19. The rear main bearing cap 19 is secured to the cylinder block about the journal 18 by bolts 21. Rear main bearing cap 19 is provided with an axially rearwardly spaced integral flange 25 that accommodates the novel sealing means to be later described. Upper rear main bearing support 16 and the rear main bearing cap 19 have rear main bearing sections 20 and 22 that are in contact with journal 18 of the crankshaft 17.

Crankshaft 17 is further provided near its terminal end with an integral oil slinger 23. Oil slinger 23 directs oil through opening 26 located between the rear main bearing cap 19 and its integral flange 25 to the oil pan 13. An asbestos or other suitable rope seal 24 is provided an annular grooves in both the cylinder block 11 and the rear main bearing cap integral flange 25 for sealing the terminal end of the crankshaft.

Sealing of the oil pan 13 to the underside of the cylinder block flange 12 adjacent to the saddle shaped portion 15 and the rear main bearing cap integral flange 25 is accomplished by seal 28. Seal 28 also seals the joint between the rear main bearing cap integral flange 25 and the saddle shaped portion 15. Seal 28 is disposed in peripheral groove 33 in the semicylindrical edge 27 of the rear main bearing cap integral flange 25.

Referring specifically now to FIGURES 3 through 7, seal 28 is provided with an arcuate intermediate portion 29 having a pair of ridges 36 that engage the groove 33 of the rear main bearing cap integral flange 25. Seal 28 is further provided with diametrically extending terminal flanges 30, each provided with a recess 31. The recess 31 receives pilot tab portions 34 of the oil pan gasket 32 and provides an overlapping joint between the oil pan gasket and the seal to insure a continuous sealing joint.

Sealing of the oil pan to the underside of the cylinder block and rear main bearing cap integral flange 25 is accomplished by the outer body portion 37 and the terminal flanges 30 of the seal 28. Body portion 37 and terminal flanges 30 are compressed by the oil pan flange 38 when the oil pan is secured in place by bolts 14.

Sealing of the rear main bearing cap integral flange 25 to the saddle shaped portion 15 is accomplished by upstanding projections 35 that extend above the terminal flanges 30. Projections 35 are disposed in that part of the peripheral groove 33 located within a portion of the integral flange 25 that extends circumferentially into the arcuate recess of the saddle-shaped portion 15. When the oil pan 13 is secured in place, the projections 35 will be compressed between the adjacent surfaces of the integral flange 25 and the saddle-shaped portion 15 to form a seal.

It will be understood that the invention is not to be limited to the exact construction shown and described but that various changes and modifications may be made without departing from the spirit and scope of the invention as defined in the appened claims.

I claim:

1. An internal combustion engine comprising a cylinder block having an upper rear main bearing support terminating in a saddle shaped portion, a rear main bearing cap mounted in part in said saddle shaped portion, said rear main bearing cap having a peripheral groove, a seal having an intermediate portion and an upstanding projection at each end of the intermediate portion located in said peripheral groove and terminal flanges extending outwardly from said seal between the intermediate portion and each upstanding projection, each of said upstanding projections being disposed between the saddle shaped portion and the rear main bearing cap confined in said saddle shaped portion, each of said terminal flanges underlying a portion of the cylinder block adjacent said saddle shaped portion, and an oil pan underlying said cylinder block and in contact with the intermediate portion and the terminal flanges of said seal.

2. An internal combustion engine comprising a cylinder block having an upper main bearing support terminating in an arcuate recess, a main bearing cap secured to said cylinder block and having a part extending circumferentially into said arcuate recess, and a seal having end projections sealingly contacting the overlapping parts of said main bearing cap and said arcuate recess and an intermediate portion sealingly contacting the peripheral edge of the remaining part of said main bearing cap.

3. An internal combustion engine comprising a cylinder block having an upper main bearing support terminating in an arcuate recess, a main bearing cap secured to said cylinder block and having a part at each side thereof extending circumferentially into said arcuate recess, and a seal having end projections sealingly contacting the overlapping parts of said main bearing and said arcuate recess, an intermediate portion sealingly contacting the peripheral edge of the remaining part of said main bearing cap and terminal flanges underlying said cylinder block adjacent said arcuate recess.

4. An internal combustion engine comprising a cylinder block having an upper main bearing support terminating in a saddle shaped portion, a main bearing cap secured to said cylinder block adjacent said upper main bearing support and said saddle shaped portion, an oil pan removably secured to said cylinder block about said main bearing cap, oil pan gasket means positioned between adjacent surfaces of said oil pan and said cylinder block, said oil pan gasket means terminating in end parts adjacent said main bearing cap, and a seal having an intermediate portion received between said oil pan and said main bearing cap and terminal flanges received between said oil pan and said cylinder block adjacent said saddle shaped portion, each of said terminal flanges of said seal having recesses receiving the end parts of said oil pan gasket means.

5. An internal combustion engine comprising a cylinder block having an upper main bearing support terminating in a saddle shaped portion, a main bearing cap secured to said cylinder block and having a part overlapping a part of said saddle shaped portion, an oil pan removably secured to said cylinder block about said main bearing cap, oil pan gasket means positioned between adjacent surfaces of said oil pan and said cylinder block, said oil pan gasket means terminating in end parts adjacent said main bearing cap, and a seal having end projections sealingly contacting the overlapping parts of said main bearing cap and said saddle shaped portion, an intermediate portion sealingly contacting the peripheral edge of the remaining part of said main bearing cap and the adjacent oil pan surface and terminal flanges underlying said cylinder block adjacent said saddle shaped portion, each of said terminal flanges having a recess receiving the end parts of said oil pan gasket means.

6. An internal combustion engine comprising a cylinder block having an upper main bearing support terminating in an arcuate recess, a main bearing cap secured to said cylinder block and having a part at each side thereof extending circumferentially into said arcuate recess, an oil pan removably secured to said cylinder block about said main bearing cap, and a seal having end projections sealingly contacting the overlapping parts of said main bearing cap and said arcuate recess and an intermediate portion adapted to be compressed between said oil pan and said main bearing cap.

7. An internal combustion engine comprising a cylinder block having an upper main bearing support terminating in an arcuate recess, a main bearing cap secured to said cylinder block and having a part at each side thereof extending circumferentially into said arcuate recess, an oil pan removably secured to said cylinder block about said bearing cap, and a seal having end projections sealingly contacting the overlapping parts of said main bearing cap and said arcuate recess, terminal flanges compressed between said oil pan and said cylinder block adjacent said arcuate recess and an intermediate portion compressed between the remaining part of said main bearing cap and said oil pan.

8. In combination, a first member having a recess formed therein, a second member secured to said first member and having a first part extending into said recess and a second part extending away from said recess, a peripheral groove formed in the parts of said second member, and a seal received in and sealingly engaging said peripheral groove of said second member, said seal having an intermediate portion sealingly engaging the second part of said second member and a projecting end portion sealingly engaging said recess of said first member.

9. In combination, a first member having a recess formed therein bounded by peripheral flanges, a second member secured to said first member and having a first part extending into said recess and a second part extending away from said recess, a peripheral groove formed in the parts of said second member, and a seal received in and sealingly engaging said peripheral grove of said second member, said seal having an intermediate portion sealingly engaging the second part of said second member, a projecting end portion sealingly engaging the recess of said first member and a terminal flange sealingly engaging the peripheral flange of said first member.

References Cited by the Examiner
UNITED STATES PATENTS
2,914,038   11/59   McKellar _____ 277—58

ROBERT C. RIORDON, *Primary Examiner.*
R. WILKINSON, *Examiner.*